Jan. 4, 1944.  H. H. SNYDER  2,338,210
PROCESS FOR TREATING EXPANSIBLE PLASTIC TUBES
Filed Oct. 21, 1940
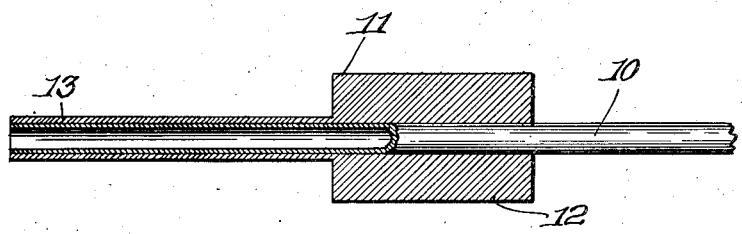
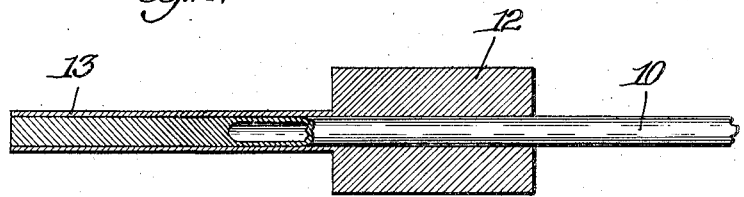
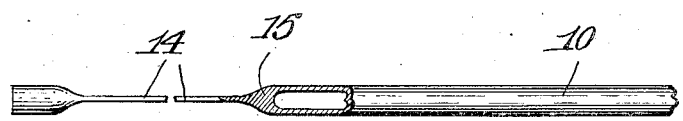
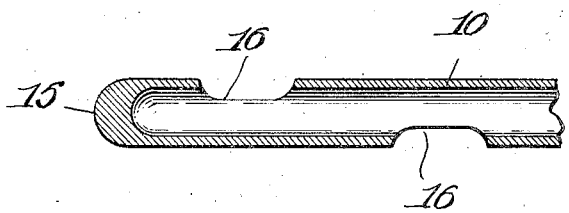
Inventor:
H. Howard Snyder,
By Chritton, Wiles, Davies, Hirschl & Dawson,
Attys.

Patented Jan. 4, 1944

2,338,210

UNITED STATES PATENT OFFICE 2,338,210

PROCESS FOR TREATING EXPANSIBLE PLASTIC TUBES

Henry Howard Snyder, Chicago, Ill.

Application October 21, 1940, Serial No. 362,150

7 Claims. (Cl. 18—47.5)

This invention relates to a process for treating expansible plastic tubes and expansible solid plastic material, and more particularly for the forming of closed ends or heads for the tubes and for the forming and shaping of heads or ends on the solid plastic material.

An object of the invention is to provide simple and effective method steps for treating expansible plastic tubes so that the ends of the tubes are closed with smooth joints or heads. A further object is to provide a process for treating expansible plastic tubes to produce a closure of the ends thereof and further for forming openings in or adjacent the ends.

The invention is illustrated, in an illustrative embodiment, by the accompanying drawing, in which:

Fig. 1 is a longitudinal sectional view of a mold device into which a plastic tube is inserted; Fig. 2, a view similar to Fig. 1 but showing the end of the tube solidified after treating; Fig. 3, a view of the tube after treating and illustrative of the step of drawing the end of the tube to provide a round contour head; and Fig. 4, an enlarged longitudinal sectional view of the finished tube end.

In the illustration given in Figs. 1 to 4 inclusive, the plastic tube is indicated by the numeral 10. It may be formed of any plastic material which has a tendency to expand and set in expanded condition. For example, "Permalon," a trade name for a co-polymer of vinylidene chloride and vinyl chloride, may be used. A tube formed of this material is soft and pliable and satisfactory for many uses. To form a smooth head for such a product and for similar plastic products, while at the same time closing it, presents a serious problem.

I have discovered that a very satisfactory method which is quick, certain, and inexpensive may be provided as follows:

The plastic tube 10 is placed within a mold 11, the rear portion of which 12 is relatively thick, while the forward tubular portion 13 is quite thin. The tube 10 is inserted within the mold, as illustrated in Fig. 1, with the end of the tube preferably approaching the end of the tubular portion 13. If desired, the end of the tube need not reach the end of the tubular portion 13, but may be maintained at a spaced distance to the rear of it. A brief but fairly intense heat is applied to the end of the tubular portion 13 of the mold and the mold is withdrawn before there is any conduction of heat to the rear of the mold form 12. For example, the portion 13 is quickly placed above the flame of a Bunsen burner for a second or two. The heat can also be applied by immersion in hot oil. The heat causes the tube 10 to expand, and since expansion outwardly is prevented by the tubular wall 13, the expansion takes place inwardly so as to completely seal the end of the tube. At the same time, there is no expansion in the portion of the tube emerging at the rear of the mold portion 12, so that a smooth tube uniform throughout is produced with the forward end closed. The tube 10 is then quickly removed from the mold.

After the removal of the tube 10 from the mold, I draw the forward tip portion of the tube 10 in a forward direction, with the result that a thin threadlike filament 14 is produced. The drawing operation first produces a cone shape, and as the drawing continues, it causes the end of the tube to become round. In the particular illustration given, the drawing is continued until the forward end of the tube becomes rounded in a smooth contour, as illustrated in Fig. 3. The attenuation of the thread 14 after the head is finally formed, enables it to be severed at the point of the head leaving, without any necessary further operation, a smooth rounded front end portion 15. It will be understood that the drawing may be discontinued at any stage in the operation to leave any desired cone shape.

The tube may now be modified to fit it for a variety of uses. If it is to be used as a ureteral or uretheral catheter, a pair of openings are formed in the forward end portion, as illustrated in Fig. 4. In attempting to cut this material, I have found that, by reason of its plastic character, an undesirable ragged and uneven cut is produced on the inner surface of the tube. I have found that a true and even cut along the inner surface or margin of the tube may be produced by inserting a solid core of the same material, or any other suitable material, into the head through the rear portion of the tube, which core supports the edge of the opening being cut. Then a milling cutter readily forms the openings as indicated by the numeral 16. After the milling operation, the solid core is withdrawn and any roughness on the exterior of the hole is trimmed and cut away with a sharp knife or razor blade.

Instead of forming straight heads of uniform diameter, it will be understood that heads of varying shapes and, if desired, of enlarged diameter or contour may be produced by simply changing the shape or design of the mold, the mold can either be divided where the tube is expanded into larger dimensions to permit the removal of the head or constructed as shown in Fig. 1. I prefer to form the forward end portion of the head with the smooth contour desired by drawing the end to provide the thin thread and then continuing the drawing of the thread until the forward portion of the head is formed at the desired relative point with respect to the hollow interior of the tube.

Before inserting the tube within the mold for heating, I prefer to dip the end portion in a lubricating oil. For example, an automobile engine lubricant having an S. A. E. viscosity of 10 is satisfactory, although other widely varying lubricants may be used with good results.

If desired, the lubricant may be omitted in the treating operation. I prefer to use it, however, because of the increased efficiency produced in the forming operation.

Since one of the main values of the product is its softness and pliability, and since the tendency of the heating step is to provide a solid and rather rigid end, I have found that the softness of the tube is restored by the drawing step and thus the drawing of the forward end of the tube not only produces a contour of the desired character but also restores to the forward end of the tube the characteristic softness of the original tube.

In the heating operation, it is quite important that the heat not reach the rear portion of the mold because this would tend to expand that portion of the tube extending from the rear portion of the mold. In the particular molds shown with an extremely thin tubular portion and a solid rear portion, it is found that the application of intense heat in the forward end of the tube for a very brief interval enables sufficient heat to reach the plastic tube end so as to produce the solid end portion while at the same time there is no substantial transfer of heat to the rear portion of the mold and therefore the portion of the tube extending from the rear portion of the mold is unchanged in diameter.

While I have shown a particular form of mold for enabling the heat to readily reach the forward end of the tube without passing through the rear portion of the mold to any substantial degree, it will be understood that a variety of different forms of molds or tubes may be employed. If desired, a metal tube longer than the mold illustrated and of a length great enough to prevent any substantial transfer of heat from the heated to the unheated portion of the tube would produce essentially the same results. Other forms of molds may obviously be used.

While in the foregoing description, I have set forth certain specific steps and materials, it will be understood that these are set forth for the purpose of illustrating the invention and particularly one mode in which it may be effectively carried out, and that wide variations may be made in such steps and materials by those skilled in the art without departing from the spirit of my invention.

I claim:

1. In a process of the character set forth for treating expansible plastic tubes, the steps of inserting the end portion of a tube into a mold tightly receiving the same, heating the forward end portion of the tube in the mold without substantially heating the rear portion of the mold to cause only the walls of the forward portion of the tube within the mold to become plastic and to expand to close the tube, removing the tube from the mold and, while still plastic from the heat imparted thereto in the mold, drawing the forward end portion thereof to form a thread, and severing the thread.

2. In a process of the character set forth for treating expansible plastic tubes, the steps of enclosing the end of the tube within a mold frictionally receiving the tube, heating the end portion of the mold to cause the forward end portion of the tube within the mold to become plastic and to expand the walls thereof inwardly and produce a solid end, withdrawing the tube from the mold and, while still plastic from the heat imparted thereto in the mold, drawing the forward solid end portion thereof forwardly to form an attenuated thread, and severing the thread.

3. In a process of the character set forth for treating expansible plastic tubes, the steps of applying a lubricant to the forward end of the tube, enclosing the end of the tube within a mold frictionally receiving the tube, heating the end portion of the mold to cause the forward end portion of the tube within the mold to become plastic and to expand the walls thereof inwardly and produce a closed end, withdrawing the tube from the mold and, while still plastic from the heat imparted thereto in the mold, drawing the forward closed end portion thereof forwardly to form an attenuated thread, and severing the thread.

4. In a process of the character set forth for treating expansible plastic tubes, the steps of inserting the tube within a closely-fitting mold of substantially the same diameter as said tube, briefly heating the forward end portion only of the mold to cause the walls of the front portion of the tube to become plastic and expand inwardly to provide a closed end, withdrawing the tube from the mold and while still plastic from the heat imparted thereto in the mold, drawing a portion of said closed end forwardly to form a thread, and cutting the thread after the remaining portion of the forward end of the tube has assumed a desired rounded contour.

5. In a process of the character set forth for treating expansible plastic tubes, the steps of lubricating the forward end of the tube, inserting the same within a tightly-fitting mold, heating the forward end portion of the tube within the mold sufficiently to cause the walls thereof to become plastic and flow inwardly forming a closed end without substantially modifying the remaining portion of the tube within the mold, and removing the tube from the mold.

6. In a process of the character set forth for treating expansible plastic tubes, the steps of inserting a tube within a mold of substantially the same diameter as said tube, thus producing a tight fit, and heating only the forward portion of the tube to cause the walls thereof to become plastic and to expand inwardly to provide a closed end without expanding the portion of the tube extending from the rear of the mold, and withdrawing the tube from the mold.

7. In a process of the character set forth for treating tubes formed of a co-polymer of vinylidene chloride and vinyl chloride, the steps of inserting the forward end portion of a tube within a tightly fitting mold, heating only the forward end portion without substantially heating the portion of the tube emerging from the rear of the mold, the walls of the forward heated portion of the tube becoming plastic and being expanded inwardly to form a closed end, and withdrawing the tube.

H. HOWARD SNYDER.